Patented Apr. 12, 1949

2,467,212

UNITED STATES PATENT OFFICE 2,467,212

LIQUID UREA-FORMALDEHYDE COMPOSITIONS

Hamline M. Kvalnes, Wilmington, Del., assignor to E. I. du Pont de Nemours & Company, Wilmington, Del., a corporation of Delaware No Drawing. Application March 6, 1947,
Serial No. 732,927

9 Claims. (Cl. 260—553)

REISSUED

NOV 29 1949

This invention relates to liquid, unpolymerized urea-formaldehyde reaction products and more particularly to liquid compositions comprising highly stable methylolureas and methods for preparing the same.

Heretofore, it was well known that by reaction between urea and aqueous formaldehyde (usually in the presence of an alkaline buffer) methylolureas, such as monomethylolurea, dimethylolurea, and mixtures of monomethylolurea and dimethylolurea could be obtained. These unpolymerized monomethylol- and dimethylolureas were crystalline bodies which did not dissolve in all proportions in water and which did not yield permanently stable aqueous solutions. In general, aqueous solutions of monomethylol- or dimethylolurea, even in the presence of neutral or slightly alkaline buffers, developed opalescence upon storage for a relatively short time especially at elevated temperatures. More prolonged storage generally resulted in the formation of precipitates and the partial resinification of the methylolureas. This characteristic property of monomethylolurea and dimethylolurea has limited to some extent the usefulness of these substances, especially in commercial applications requiring clear, permanently stable, urea-formaldehyde in relatively concentrated liquid form. Attempts have been made in the past to prepare methylolureas having a higher formaldehyde: urea ratio than dimethylolurea, but in no instance has a compound corresponding to tetramethylolurea or trimethylolurea been isolated. Moreover, it has generally not been possible heretofore to prepare at ordinary temperature unresinified methylolureas in sufficiently high concentration to permit their use as impregnating agents in processes requiring a very highly concentrated liquid urea-formaldehyde reagent.

An object of this invention is to provide a stable, liquid urea-formaldehyde reaction product in an unpolymerized form. Another object of the invention is to provide a process for the preparation of liquid, permanently stable, unpolymerized urea-formaldehyde compositions which are high in content of resin-forming ingredients, and which are suitable for shipment in commercial tank car equipment. Other objects of the invention will appear hereinafter.

The objects of this invention are accomplished as a result of a combination of discoveries, all of which contribute to the extraordinary results achieved. One of the discoveries embodied in the present invention is the observation that when mixtures of gaseous formaldehyde and water vapor at elevated temperatures are cooled to about 60° to 90° C. (suitably by absorption in a circulating formaldehyde-water mixture having a formaldehyde and water content about the same as that of the absorbed gases), the resulting molten mixture containing more than 50% by weight of formaldehyde (such mixtures being solid at ordinary temperature) has significantly different chemical properties if maintained continuously at a temperature above 60° C. than it has if permitted to cool down somewhat below 60° C. This chemical or physical change of the formaldehyde in the resulting aqueous formaldehyde mixture upon cooling below 60° is not reversible; i. e., when the liquid or solid mixture is subsequently reheated to a temperature of 60° C. to 90° C. the formaldehyde does not reacquire the characteristics which are essential in the preparation of the reaction products hereinafter described. It has been discovered in accordance with this invention that when an aqueous liquid, prepared from gaseous formaldehyde and water at a temperature of 60° to 90° C. in the proportions necessary to form a molten mixture containing 50% to 70% by weight of formaldehyde, is reacted with urea (the relative quantities are disclosed hereinafter) at a pH within the range of 7.0 to 9.0, and the temperature of the mixture is thereafter maintained at least momentarily at from 70° to 90° C., a permanently stable clear liquid product is obtained, provided the molten aqueous formaldehyde mixture is kept continuously at a temperature above 60° C. prior to admixing the same with urea. If a similarly prepared aqueous formaldehyde of the same strength is permitted to cool to a temperature below 60° C. before the reaction with urea, a liquid composition which develops opalescence upon storage is obtained. A brief cooling to a temperature not below about 45° C. frequently can be tolerated, but this is always a dangerous practice, since complete assurance against development of opalescence is highly important in commercial practice.

It has also been discovered in accordance with this invention that the initial mol ratio of formaldehyde to urea is highly critical in the production of the clear, stable, liquid products above described, containing, in preferred embodiments, about 60 to 80% by weight of urea-formaldehyde. When the initial mol ratio of formaldehyde:urea is below about 3.9, the process of the invention does not give rise to products which have the stability which is desirable in commercial applications but to products which develop cloudiness upon storage. However, when the initial mol ratio of formaldehyde:urea is about 6.0, the process above described yields permanently stable, clear, liquid products. When the initial mol ratio of formaldehyde:urea is from about 7:1 to about 10:1, the reaction product does not remain permanently clear except at temperatures in excess of 50° C.; if the said reaction product is cooled below 50° C., a precipitate develops. However, if the urea is added to the reaction mixture in two stages, the initial mol ratio in the first stage being from about 5.5:1 to about 10:1, and the mol ratio of total formaldehyde to total urea being finally not less than 4.5:1, nor more than 7:1, permanently stable, clear, liquid compositions which do not form precipitates at room temperature or at temperatures encountered under ordinary storage conditions are obtained. The preferred liquid compositions, prepared by either the one-stage or two-stage embodiments of the invention, contain formaldehyde and urea in the mol proportions of from 4.5:1 to 7:1, since they remain clear liquids when cooled to about 25° C.

The liquid compositions of this invention evidently contain higher methylolureas and free formaldehyde, the free formaldehyde being stabilized at such a stage of polymerization that it tends to solubilize the methylolureas and does not tend to form precipitates of paraformaldehye or other relatively insoluble formaldehyde polymers. These liquid compositions differ from acidic urea-formaldehyde mixtures as prepared by previously known procedures which contain very little free formaldehyde, and which contain the uron ring. The preferred compositions of this invention are miscible with water in all proportions and are generally water clear, limpid liquids. They have the consistency and appearance of other unpolymerized organic liquids, such as ethylene glycol. These preferred compositions are rich in free formaldehyde, the mol ratio of combined formaldehyde to free formaldehyde therein being about 1:1 to 3:1. It is indeed highly surprising that normally liquid compositions which do not develop cloudiness can be prepared by mixing a normally solid aqueous formaldehyde composition with solid crystalline urea.

In the preparation of these clear liquid compositions, it is highly essential that the pH be carefully controlled since even slight deviation from the pH range of 7.0 to 9.0 gives rise to products which develop opalescence. A definite optimum clarity and stability of these liquid products is encountered at a pH of 8. It is generally preferred to adjust the pH of the aqueous formaldehyde prior to admixing the aqueous formaldehyde with the urea. Sodium or potassium hydroxide may be used as the sole agent for controlling alkalinity, but alkaline buffers are preferred. At any pH above 9 polymerization of the formaldehyde occurs in the absence of urea. The longer the time during which such polymerization occurs, the less stable is the urea-formaldehyde liquid product which is prepared therefrom.

In one embodiment of the invention, moist gaseous formaldehyde which has been maintained at a temperature above 60° C. and which, in fact, is directly piped (while still hot) from the plant for manufacturing formaldehyde from methanol, is admixed with an additional small quantity of water until a composition containing about 60% formaldehyde is obtained. In practice, it is convenient to effect rapid cooling of the hot vapors in a scrubber through which is circulated cooled 60% formaldehyde. In this embodiment the moist gaseous formaldehyde, prior to absorption, usually contains the stoichiometric quantities of formaldehyde and water which are produced by methanol oxidation, so that no more than a few percent of water should be added. One reason for adding this water is to control accurately the concentration of formaldehyde from the scrubber. Substantially no methanol is present in the product. The temperature of the resulting aqueous formaldehyde is kept above 60° C. until urea is admixed therewith. Usually the aqueous formaldehyde mixture as first prepared has a pH of about 3. A convenient method for adjusting this pH to 7.0–9.0 is to treat the said aqueous formaldehyde (at a temperature exceeding 60° C.) with a sufficient quantity of phosphoric acid and sodium hydroxide to produce the desired pH. Any other buffer mixture which produces this pH may be employed; for example, mixtures of sodium hydroxide and boric acid, or other similar buffer mixtures, give substantially the same results as are obtained with the phosphoric acid-sodium hydroxide buffer.

The table presented in Example I illustrates several embodiments of the invention and demonstrates the critical effect of lowering the formaldehyde:urea ratio below about 3.9 or raising this ratio above about 7.0. In this table, the color of the liquid reaction product is reported in terms of a color scale in which water white is assigned a value of 2, which corresponds to 0.003 grams of potassium dichromate per liter of distilled water. The "F/U" ratio is the mol ratio of total formaldehyde to total urea, i. e. it includes the free and combined reactants. The "opaque point" reported in the table is the temperature at which a clear urea-formaldehyde liquid becomes cloudy upon chilling a sample thereof (about 10 ml.) with stirring in a test tube having a diameter of about one inch; the cooling of the sample is accomplished by intermittent dipping in acetone-Dry Ice mixture. Tests 1(c), 1(d) and 1(e) in Table 1 represent preferred embodiments of the process of this invention.

In one method of practicing the invention, the initial mol ratio of formaldehyde:urea may be above about 5:1 and as high as about 10:1. However, the use of very high ratios (e. g., 10:1) is disadvantageous because while the resultant products remain liquid when cooled to about 50° C., they do not remain liquid when cooled below 50° C. Additional quantities of urea may be added to such mixtures to produce a permanently stable liquid product having any desired ratio of formaldehyde:urea within the range of about 4.5:1 to about 7:1. It is, however, preferred to prepare the permanently stable mixture having an F/U ratio of about 6 directly. This, of course, permits subsequent adjustment of the F/U ratio to any desired value by addition of urea to the mixture having an F/U ratio of 6.

The invention may be practiced by preparing an aqueous liquid mixture from the herein disclosed quantities of gaseous formaldehyde and water at 60° to 90° C. by any convenient method whatever, and suitably by liquefying a gaseous formaldehyde water-vapor mixture having a temperature above 90° C. and containing about 50% to 70% by weight of formaldehyde by cooling the said aqueous liquid mixture to a temperature of 60° to 90° C., keeping the temperature of the said aqueous liquid mixture substantially continuously above 45° C., and preferably above 60° C., until the said liquid is brought into contact with urea, admixing urea with the said liquid in the presence of a buffer which maintains the pH within the range of 7.0 to 9.0, the amount of the said urea being preferably in the proportion of one mol per 4.5 to 10 mols of the said formaldehyde, and maintaining the temperature of the resultant liquid at least momentarily (i. e. for one or two minutes) at a temperature of 70° to 90° C. whereby a product which remains a clear liquid when cooled to 50° C. is obtained. In specific embodiments the initial mol ratio of formaldehyde : urea should be from about 4.5 to 7.0, if a reaction product which remains a clear liquid when coled to room temperature (and in fact well below room temperature) is desired. The optimum initial mol ratio of formaldehye:urea for permanent stability is 6:1. In particular embodiments of the invention, the clear liquid initially obtained as above described may be treated with additional amounts of urea to bring the formaldehyde:urea ratio down to as low as about 3.9; the resultant products are still stable, clear liquids. The temperature of the mixture is preferably lowered to below 50° C. prior to this second addition of urea, because otherwise a product which develops cloudiness relatively rapidly on standing is obtained. Moreover, the reaction which takes place above about 50° C. as a result of this second addition of urea is exothermic and it is essential to avoid temperatures exceeding about 90° C. Unless the mixture is cooled before the second addition of urea, temperature control becomes quite difficult, and excessive temperatures are reached.

The invention also contemplates still further additions of urea to the mixtures having an F/U ratio of 4 to 6, whereby reaction mixtures containing free formaldehyde and monomethylol and/or dimethylolureas are formed. The latter step is generally performed immediately prior to actual use of the urea: formaldehyde composition (e. g., as an impregnating agent). In this manner it is possible to avoid the formation of precipitates or polymeric products prematurely in urea:formaldehyde compositions comprising monomethylol and/or dimethylolurea. It thus becomes possible for the producer of the chemical to ship the permanently stable composition having an F/U ratio of 4 to 6 in tank cars, and for the resin manufacturer to adjust the F/U ratio of the mixture to the desired value by addition of urea shortly before the resin-forming composition is to be used.

The invention is illustrated by means of the following examples which show the preparation of a clear, stable, liquid urea-formaldehyde reaction product in which the formaldehyde component prior to reaction with urea is in the form of an aqueous molten mixture which has been maintained continuously at a temperature above about 45° C. from the time of its formation from gaseous formaldehyde and water vapor at 60° to 90° C. until the time of its reaction with urea. The examples also demonstrate several of the important differences between the composition and process of the present invention, and previously known compositions and processes.

*Example I.*—The following table records in detail several comparative experiments which illustrate the process of the invention.

TABLE 1

*Preparation of liquid urea-formaldehyde products*

| Test number | 1(a) | 1(b) | 1(c) | 1(d) | 1(e) | 1(f) |
|---|---|---|---|---|---|---|
| HCHO sol'n, g | 1,000 | 984 | 976 | 976 | 1,000 | 500 |
| HCHO, wt. per cent | 60 | 61.0 | 61.5 | 61.5 | 60 | 60 |
| HCHO, g | 600 | 600 | 600 | 600 | 600 | 300 |
| HCHO, moles | 20 | 20 | 20 | 20 | 20 | 10 |
| Temp. when buffered, °C | 62 | 79 | 80 | 76 | 75 | 70 |
| Buffer | $1MH_3PO_4$ | $1MH_3PO_4$ | $1MH_3PO_4$ | $0.5MH_3BO_3$ | $0.5MH_3BO_3$ | $1MH_3PO_4$ |
| Amt. of buffer, ml | 8 | 8 | 8 | 16 | 16 | 2 |
| Amt. of 2.5N·NaOH, ml | 16 | 16 | 16 | 16 | 16 | 7 |
| *1st Urea addition* | | | | | | |
| Time, mins. from buffering | 4 | 8 | 3 | 6 | 3 | 3 |
| Temp. °C | 58 | 68 | 65 | 65 | 65 | 65 |
| Urea, g | 200 | 200 | 200 | 200 | 200 | 75 |
| Urea, moles | 3.33 | 3.33 | 3.33 | 3.33 | 3.33 | 1.25 |
| F/U | 6 | 6 | 6 | 6 | 6 | 8 |
| Max. temp., °C | 80 | | 87 | 89 | 86 | 73 |
| *Water addition* | | | | | | |
| Temp. when $H_2O$ added, °C | 79.5 | [1] 25 | 86.5 | 88.5 | | |
| Amt. $H_2O$ added, g | 41 | 36 | 34 | 34 | | |
| *2nd Urea addition* | | | | | | |
| Time, mins. from buffering | 14 | [1] Ca. 1,000 | 13 | 15 | | |
| Temp., °C | 50 | 25 | 50 | 50 | | |
| Urea, g | 143 | 108 | 100 | 100 | | |
| *Total urea addition* | | | | | | |
| Urea, g | 343 | 308 | 300 | 300 | 200 | 75 |
| Urea, moles | 5.71 | 5.13 | 5 | 5 | 3.33 | 1.25 |
| *Product [2]* | | | | | | |
| Clarity | Opaque | Clear | Clear | Clear | Clear | Opaque |
| F/U [3] | 3.5 | 3.9 | 4.0 | 4.0 | 6.0 | 8.0 |
| Total non-aqueous ingredients, per cent [3] | 67 | 67 | 67 | 67 | 65 | 64 |
| Free HCHO, per cent | | 12.3 | 13.4 | 13.3 | 20.8 | |
| Combined HCHO, per cent | | 31.9 | 31.4 | 31.2 | 27.6 | |
| Total HCHO, per cent [3] | 42.5 | 44.2 | 44.8 | 44.5 | 48.4 | 51.3 |
| Urea, per cent [3] | 24.3 | 22.7 | 22.4 | 22.2 | 16.1 | 12.8 |
| Combined HCHO/free HCHO | | 2.6 | 2.2 | 2.3 | 1.3 | |
| Color | | <1 | <1 | <1 | <2 | |
| Water miscibility | | Complete | Complete | Complete | Complete | |
| pH [4] | 9.0 | 7.8 | 8.0 | 8.6 | 8.3 | 8.8 |
| Sp. gr. 60° F./60° F | | 1.268 | 1.261 | 1.259 | 1.264 | |
| R. I. at 25° C. (refractive index) | | 1.447 | 1.443 | 1.442 | 1.443 | |
| Opaque point, °C | | −24 | −24 | −22 | −29 | |
| Viscosity, cp. at 100° F | | 14 | 13 | 14 | 15 | |

[1] Water and second urea addition on day following preparation of F/U 6.
[2] Properties of the product are for material aged 1 month except as noted otherwise.
[3] Based upon the weight of the starting materials.
[4] When prepared. The glass electrode method was used.

*Example II.*—A sample of 60% formaldehyde similar to the material used in the tests of Table 1 was stored at room temperature for 6 days. The solid formaldehyde was then heated to 75° C. and a urea:formaldehyde composition having a formaldehyde:urea ratio of 4 was prepared using the same procedure as is described in test 1(c) of Table 1. The buffered aqueous formaldehyde mixture at 75° C. was liquid but opaque. However, on making the first urea addition at 65° C. the temperature rose, and the mixture became clear. The resultant liquid urea:formaldehyde reaction mixture remained clear when cooled to room temperature; however, in contrast with the product obtained in test 1(c) this liquid product became opalescent on storage at room temperature for two days. Further storage of the mixture for a period of one month caused the formation of a considerable precipitate.

This example illustrates the fact that the change in the formaldehyde properties upon cooling is not reversible upon simple reheating to 75° C. Once the formaldehyde has been converted to the form which is produced by cooling, mere reheating to the reaction temperature does not reconvert it to the form needed for the preparation of the permanently stable (i. e., clear) urea-formaldehyde products.

*Example III.*—A sample of the liquid urea-formaldehyde composition having a formaldehyde to urea ratio of 6 was prepared by the procedure of test 1(e) of Table 1, except that the formaldehyde mixture initially contained 63.5% HCHO, and the pH of the formaldehyde was adjusted to 9 prior to adding the urea. The resulting liquid product (urea-formaldehyde content, 70%) was cooled to room temperature and stored for a period of 14 weeks at which time the test was terminated. The product remained liquid entirely clear throughout this period.

*Example IV.*—Samples having a formaldehyde:urea ratio of 8 (cf. Example III, in which a very stable product was obtained when the F/U ratio was 6) were prepared using the procedure illustrated in test 1(f) of Table 1, except that the pH of the aqueous formaldehyde was adjusted as set forth below. The table records the effect of pH of the formaldehyde on the clarity of the products.

TABLE 2

*Effect of pH on clarity of product at an F/U ratio of 8*

| Test number | 2 (a) | 2 (b) | 2 (c) |
|---|---|---|---|
| pH | 8.65 | 7.5 | 2.8 |
| *Clarity of Product* | | | |
| (1) Aged 1 day at room temp | cloudy | clear | cloudy |
| (2) Aged 2 days at room temp | opaque | opaque | opaque |

*Example V.*—To 309 ml. of 39.4% aqueous formaldehyde in an open beaker was added 5 grams of barium hydroxide, and to the resulting cloudy solution 60 grams of urea was added (formaldehyde:urea ratio, about 4.6). The open beaker was placed in a pan of boiling water for 10 minutes and was then heated on a steam bath overnight. The reaction mixture was cloudy at all times. Even when the cloudy precipitate was removed by filtration, the clear filtrate developed cloudiness within two hours. The free formaldehyde in this mixture was 7.43% of the total weight of the mixture and the ratio of combined formaldehyde to free formaldehyde was 5.82. The pH of the product was 7.3. In a second preparation using the above procedure the reaction mixture was left on the steam bath for 22 hours. A cloudy liquid product which could not be filtered except by suction was obtained.

This example illustrates the fact that the procedure described in the laterature for the preparation of higher methylolureas (and products obtained therefrom such as uron ethers) is not applicable for the preparation of clear, stable liquid products which are obtained in accordance with the present invention.

*Example VI.*—To 100 grams of the reaction product obtained in accordance with the process described in test 1(d) in Table 1 was added a solution containing 22.3 grams of urea and 768 grams of water. The resulting product, which initially had a free formaldehyde content of 2.7%, was heated at the temperature set forth below. This caused the free formaldehyde in the mixture to react with urea forming a solution in which the ratio of combined formaldehyde:combined urea was 2. The rate of the reaction of the free formaldehyde with urea is shown in the following table.

TABLE 3

*Preparation of dimethylolurea from permanently stable liquid having an F/U ratio of 4*

| Elapsed Time | Temp. | Free Formaldehyde |
|---|---|---|
| | ° C. | Percent |
| 0 minutes | 25 | 2.7 |
| 10 minutes | 80 | 1.2 |
| 30 minutes | 95 | 0.2 |

The reaction product thus obtained was an aqueous solution of methylolurea which evidently was substantially all in the form of dimethylolurea.

*Example VII.*—The following table illustrates the formation of clear, stable urea-formaldehyde compositions when the total quantity of urea-formaldehyde (including free and combined formaldehyde) is 60% to 65% of the weight of the reaction product, the F/U ratio in the final products being 4:1.

TABLE 4

*Preparation of liquid urea-formaldehyde products*

[Urea-Formaldehyde Content 60%–65%]

| Test number | 4 (a) | 4 (b) | 4 (c) |
|---|---|---|---|
| *Formaldehyde* | | | |
| HCHO sol'n. g | 1,000 | 1,000 | 1,000 |
| HCHO, wt. per cent | 60.0 | 60.0 | 60.0 |
| HCHO, g | 600 | 600 | 600 |
| HCHO, mols | 20 | 20 | 20 |
| Temp. when buffered, ° C | 85 | 68.5 | 75 |
| Buffer | 1M-H$_3$PO$_4$ | 1M-H$_3$PO$_4$ | 1M-H$_3$PO$_4$ |
| Amt. of buffer, ml | 8 | 8 | 8 |
| Amt. of 2.5N—NaOH, ml | 16 | 16 | 16 |
| *1st Urea Addition* | | | |
| Time, mins. from buffering | 10 | 3 | 1 |
| Temp., ° C | 65 | 62.5 | 65 |
| Urea, g | 200 | 200 | 200 |
| Urea, mols | 3.33 | 3.33 | 3.33 |
| F/U | 6 | 6 | 6 |
| Max. temp., ° C | 83.5 | 83 | 86 |
| *Water Addition* | | | |
| Temp. when H$_2$O added, ° C | 83 | 82.5 | 85.5 |
| Amt. H$_2$O added, g | 176 | 104 | 60 |

TABLE 4—Continued

| Test number | 4 (a) | 4 (b) | 4 (c) |
|---|---|---|---|
| 2nd Urea Addition | | | |
| Time, mins. from buffering | 20 | 13 | 11 |
| Temp., °C | 50 | 50 | 50 |
| Urea, g | 100 | 100 | 100 |
| Total Urea Addition | | | |
| Urea, g | 300 | 300 | 300 |
| Urea, mols | 5 | 5 | 5 |
| Product [1] | | | |
| Clarity | Clear | Clear | Clear |
| F/U | 4.0 | 4.0 | 4.0 |
| Total non-aqueous ingred., per cent [2] | 59.8 | 62.4 | 64.8 |
| Free HCHO, per cent | 13.4 | 13.3 | 13.5 |
| Combined HCHO, per cent | 26.3 | 28.2 | 29.5 |
| Total HCHO per cent [2] | 39.7 | 41.5 | 43.0 |
| Urea, per cent [2] | 20.1 | 20.9 | 21.8 |
| Combined HCHO/free HCHO | 2.0 | 2.1 | 2.2 |
| Color | <1 | <1 | <1 |
| Water miscibility | Complete | Complete | Complete |
| pH | 8.3 | 8.9 | 8.5 |
| Sp. gr. 60° F./60° F | 1.234 | 1.243 | 1.252 |
| Refractive index at 25° C | 1.4315 | 1.4351 | 1.4394 |

[1] Properties of the product are for material aged 2 months except as noted otherwise.
[2] Based upon the weights of the starting materials.
[3] When prepared.

*Example VIII.*—Example III was repeated except that the second addition of urea was made at a temperature of 81° C. i. e. the mixture was not cooled to 50° C. prior to the second addition of urea. The resulting product, having an F/U ratio of 4 and a total urea-formaldehyde (free and combined) content of 70%, was not stable, but contained a precipitate after two weeks storage at room temperature.

This example illustrates the advantages which result from cooling the mixture to 50° C. (or below) prior to the second addition of urea.

The above examples serve to illustrate the invention, and to distinguish it from prior methods, especially such prior methods as fail to employ the particular formaldehyde composition herein disclosed.

The aqueous formaldehyde which is employed as a reactant in the practice of this invention is water-clear, and may be prepared by dissolving gaseous formaldehyde in water at 60° to 100° C. In a preferred embodiment a gaseous formaldehyde-water vapor mixture obtained by methanol oxidation is cooled to about 60° to 90° C. by adsorption in a circulating molten mixture of formaldehyde and water containing about 60% formaldehyde. This causes an increase in the volume of the molten mass containing about 60% to 63% formaldehyde, the remainder of the molten mass being water and a minute trace of formic acid. Any necessary adjustment of the water content can be made by subsequent introduction of water at a temperature in excess of 60° C. Water should not be added at a lower temperature, because, as explained above, the aqueous formaldehyde should be kept at 60° to 90° at all times prior to admixing it with urea.

The apparatus employed in preparing the urea-formaldehyde compositions of this invention may be any appropriate reaction vessel, equipped with means for agitating the reaction mixture and means for controlling the reaction temperature. An ordinary stirred kettle into which the molten formaldehyde and solid urea can be conducted is preferred. A trap door constitutes a suitable means for introducing the urea into the molten buffered formaldehyde mixture, or for subsequent additions of urea as above described. These subsequent additions of urea may be made in the same reaction vessel, or in a similar vessel, which may, for example, be located at a distant point. Thus, the initial addition of urea may be in the proportion of 1 mol to from 5 to 7 mols of formaldehyde. The subsequent addition of urea, whereby the total formaldehyde:urea ratio may be adjusted, for example, to a value which is less than 5 and greater than 1, can be made in very simple equipment, because of the fact that urea is very readily soluble in the initial liquid reaction product.

The liquid compositions of this invention differ from prior compositions in several different respects, and, in particular, are characterized by the following properties, and numerous others: (1) absence of uron ring, which is present in acid-treated mixtures having a high F/U ratio, (2) specific ratio of combined formaldehyde to free permanently soluble formaldehyde, which results in permanent clarity, (3) low opaque point, (4) low viscosity at high concentration of nonaqueous ingredients (high "solids content"). To obtain permanently clear products at a "solids content" of 60% to 70% or higher ("solids content" meaning the free and combined urea and HCHO), it is highly important that the compositions have the correct ratio of combined formaldehyde to free formaldehyde as herein specified. By the use of the process herein described for preparing permanently stable liquids this ratio varies from about 1:1 to 3:1, when the F/U ratio is 4:1 to 6:1; at an F/U ratio of 6:1, the ratio of combined formaldehyde to free formaldehyde is usually between 1.0 and 1.8, while at an F/U ratio of 4:1, the ratio of combined formaldehyde to free formaldehyde is usually between 1.8 and 3.0.

The "free formaldehyde" referred to throughout this specification can be measured analytically by any appropriate method, such as by the neutral sulfite procedure at 0° C.

The liquid products of this invention are widely useful in the preparation of impregnating agents, lacquers, molded products, finishes, etc. They are especially valuable in the process for impregnating wood, saw dust, wood flour, grasses, jute, hemp, rattan, reeds, palmetto, Masonite, bagasse, and other forms of lignocellulosic and cellulosic materials, described in detail in copending application S. N. 555,042, filed September 20, 1944, of which the present application is a continuation-in-part, and the parent application S. N. 478,666, filed March 10, 1943 (now U. S. Patent 2,398,649), and for the preparation of very dense impregnated wood as disclosed in copending application S. N. 588,720, now U. S. Patent 2,452,200, filed April 16, 1945, and S. N. 732,926, filed March 6, 1947.

The process of the present invention differs in certain critical respects from the process for the preparation of dimethylolurea described in U. S. Patent 2,321,544. In the latter patent it is disclosed that 62% formaldehyde in the liquid state reacts with urea at a pH of 8.1 and at a temperature of 98° C. in the mol ratio of about 2:1, and that the product obtained by cooling the mixture to a temperature of 50° C. is a clear liquid. The said liquid, however, is not permanently clear but becomes an opaque solid quite rapidly, especially when cooled to 25° C. In general, the methylolureas prepared by the process of U. S. Patent 2,321,544 cannot be obtained in the form of concentrated liquids which remain permanently clear and stable at ordinary temperatures.

I claim:

1. A process for the preparation of liquid urea-formaldehyde compositions which comprises preparing a liquid mixture from gaseous formaldehyde and water at a temperature of 60° to 90° C., the weight of formaldehyde being from 50% to 70% of the weight of the resultant aqueous liquid mixture, keeping the temperature of the said aqueous liquid continuously above 45° C. until the said liquid is brought into contact with urea, admixing urea with the said liquid at a pH within the range of 7.0 to 9.0, the amount of the said urea being in the proportion of one mol per 4.5 to 10 mols of the said formaldehyde, and maintaining the temperature of the resultant liquid at least momentarily at from 70° to 90° C., whereby a product which remains a clear liquid when cooled to 50° C. is obtained.

2. A process for the preparation of liquid urea-formaldehyde compositions which comprises preparing a liquid mixture from gaseous formaldehyde and water at a temperature of from 60° to 90° C., the weight of the formaldehyde being from 50% to 70% of the weight of the resultant aqueous liquid mixture, keeping the temperature of the said aqueous liquid continuously at 60° to 90° C. until the said liquid is brought into contact with urea, admixing urea with the said liquid in the presence of a buffer which maintains the pH within the range of 7.0 to 9.0, the amount of the said urea being in the proportion of one mol per 4.5 to 7 mols of the said formaldehyde, and maintaining the temperature of the resultant liquid at least momentarily at from 70° to 90° C. whereby a product which remains a clear liquid when cooled to 25° C. is obtained.

3. A process for the preparation of liquid urea-formaldehyde compositions which comprises liquefying a mixture of gaseous formaldehyde and water-vapor having a temperature above 90° C. by cooling to a temperature of 60° to 90° C., the weight of formaldehyde being about 60% of the weight of the resultant aqueous liquid, keeping the temperature of the said aqueous liquid continuously above 60° C. until the said liquid is brought into contact with urea, admixing urea in a stirred kettle with the said liquid in the presence of a buffer which maintains the pH within the range of 7.0 to 9.0, the amount of the said urea being in proportion to 1 mol per 6 mols of the said formaldehyde, and maintaining the temperature of the resultant liquid for about two minutes at a temperature of from 70° to 90° C., whereby a product which remains a permanently clear liquid when cooled to below 25° C. is obtained.

4. A process for the preparation of liquid urea-formaldehyde compositions which comprises liquefying a mixture of gaseous formaldehyde and water-vapor having a temperature above 90° C. by cooling to a temperature of 60° to 90° C., the weight of formaldehyde being from 50% to 70% of the weight of the resultant aqueous liquid, keeping the temperature of the said aqueous liquid substantially continuously above 60° C. until the said liquid is brought into contact with urea, admixing urea with the said liquid in the presence of a buffer which maintains the pH within the range of 7.0 to 9.0, the amount of the said urea being in the proportion to 1 mol per 6 mols of the said formaldehyde, and maintaining the temperature of the resultant liquid at least momentarily at a temperature of from 70° to 90° C., whereby a solution which remains a permanently clear liquid when cooled to 25° C. is obtained, cooling the said solution to a temperature not exceeding about 50° C., thereafter admixing an additional quantity of urea with the said solution in such proportions that the mol ratio of formaldehyde:urea is not less than 3.9 to 1, whereby a product which remains a clear liquid when cooled to 25° C. is obtained.

5. A process for the preparation of liquid urea-formaldehyde compositions which comprises liquefying a mixture of gaseous formaldehyde and water-vapor having a temperature above 90° C. by cooling to a temperature of 60° to 90° C., the weight of formaldehyde being about 60% of the weight of the resultant aqeous liquid, keeping the temperature of the said liquid continuously from 60° to 90° C. until the said liquid is brought into contact with urea, admixing urea with the said liquid in a stirred kettle in the presence of a buffer which maintains the pH within the range of 7.0 to 9.0, the amount of the said urea being in the proportion of 1 mol per 5 to 7 mols of formaldehyde, cooling the resultant permanently clear liquid mixture to below 50° C., and thereafter adjusting the total formaldehyde:urea ratio to a value less than 5 and greater than 1 by adding urea to the said liquid mixture.

6. In the process set forth in claim 5 the step which comprises adjusting the final formaldehyde:urea ratio to between 1:1 and 2:1.

7. A clear, permanently stable, liquid unpolymerized urea-formaldehyde composition containing a buffer which maintains the pH at from 7.0 to 9.0, said composition being characterized in that it has a total formaldehyde:urea mol ratio of from about 4:1 to 6:1, and a ratio of combined to free formaldehyde of from 1:1 to 3:1, said composition having been prepared in accordance with the process of claim 2.

8. A clear, permanently stable, liquid unpolymerized urea-formaldehyde composition containing a buffer which maintains the pH at from 7.8 to 8.6, said composition being characterized in that it has a total formaldehyde:urea mol ratio of 4:1, a ratio of combined to free formaldehyde of from about 2.2:1 to about 2.6:1, a refractive index of about 1.442 to about 1.447, and a solids content, based on total urea and formaldehyde present, of about 67%, said composition having been prepared in accordance with the process of claim 4.

9. A clear, permanently stable, liquid unpolymerized urea-formaldehyde composition having a pH of 7.0 to 9.0, said composition being characterized in that it has a total formaldehyde:urea mol ratio of about 6:1, a ratio of combined to free formaldehyde of about 1.33, refractive index of about 1.264, and a urea-formaldehyde content, based on total urea and formaldehyde present both free and combined, of about 65%, said composition having been prepared in accordance with the process of claim 2.

HAMLINE M. KVALNES.

REFERENCES CITED

The following references are of record in the file of this patent:

UNITED STATES PATENTS

| Number | Name | Date |
|---|---|---|
| 2,321,544 | Dittmar et al. | June 8, 1943 |